(12) United States Patent
Henderson et al.

(10) Patent No.: US 11,707,965 B2
(45) Date of Patent: Jul. 25, 2023

(54) BAFFLE ASSEMBLY FOR VEHICULAR AIR CONDITIONER

(71) Applicant: Haier US Appliance Solutions, Inc., Wilmington, DE (US)

(72) Inventors: Richard Dustin Henderson, La Grange, KY (US); Joseph Robert Tobbe, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 421 days.

(21) Appl. No.: 16/438,608

(22) Filed: Jun. 12, 2019

(65) Prior Publication Data

US 2020/0391571 A1 Dec. 17, 2020

(51) Int. Cl.
*B60H 1/24* (2006.01)
*B60H 1/00* (2006.01)

(52) U.S. Cl.
CPC ..... *B60H 1/00564* (2013.01); *B60H 1/00364* (2013.01)

(58) Field of Classification Search
CPC ............ B60H 1/00564; B60H 1/00364; B60H 2001/00092; B60H 2001/00135; B60H 1/262; B60H 2001/00235; B60H 1/00378; B60H 1/00535; B60H 1/00521; B60H 1/00542; B60H 1/3407; B60H 1/248; B60H 1/3226; F15D 1/0005; F24F 1/0047; F24F 13/0209; F24F 13/20; F24F 7/007; F24F 7/013; F24F 13/06; F24F 2013/0616; F24F 2011/0006; F24F 2007/0025; F24F 7/06; F24F 7/04; F24F 7/08; E05Y 2600/626; Y10S 62/16; Y02B 30/70; Y10T 29/49359; F25D 23/069
USPC ........ 454/142, 245, 247, 248, 246, 237, 234
See application file for complete search history.

(56) References Cited

U.S. PATENT DOCUMENTS

| | | | | |
|---|---|---|---|---|
| 3,727,537 A | * | 4/1973 | Harty, Jr. ........... | B60H 1/00364 454/230 |
| 3,953,551 A | | 4/1976 | Dorall | |
| 4,608,834 A | * | 9/1986 | Rummel ............ | B60H 1/00378 296/216.02 |
| 4,709,623 A | * | 12/1987 | Roth .................. | B60H 1/00364 454/136 |
| 5,531,641 A | * | 7/1996 | Aldrich .............. | B60H 1/00364 454/100 |
| 6,339,934 B1 | * | 1/2002 | Yoon .................. | B60H 1/00364 62/244 |
| 6,357,249 B1 | * | 3/2002 | Robinson ........... | B60H 1/00364 62/244 |
| 6,375,254 B1 | * | 4/2002 | Patz ........................ | B60J 10/16 296/215 |

(Continued)

FOREIGN PATENT DOCUMENTS

GB 638853 A * 6/1950 ........... B61D 27/009

*Primary Examiner* — Steven B McAllister
*Assistant Examiner* — Cole N Friedman
(74) *Attorney, Agent, or Firm* — Dority & Manning, P.A.

(57) ABSTRACT

An air distribution assembly for a recreational vehicle may include a frame mounted within an opening of the recreational vehicle and a baffle positioned therein to sealing divide an air handling chamber into an air supply side and an air return side. The baffle may include mounting flanges for rigidly connecting the baffle to the inside surface of the frame.

20 Claims, 5 Drawing Sheets

FIG. 2

(56) References Cited

U.S. PATENT DOCUMENTS

| | | | |
|---|---|---|---|
| 6,415,620 B1 * | 7/2002 | Ferdows | B60H 1/00371 62/244 |
| 6,536,222 B1 | 3/2003 | Ahn et al. | |
| 6,857,953 B2 * | 2/2005 | Malott | B60H 1/00364 454/100 |
| 8,016,149 B2 * | 9/2011 | Goulet | H02G 3/081 220/532 |
| 9,975,405 B2 * | 5/2018 | Siddiqui | B60H 1/00364 |
| 10,334,759 B2 * | 6/2019 | Marrs | H05K 7/20736 |
| 10,488,071 B2 * | 11/2019 | Fradkin | F24F 11/0001 |
| 2008/0314072 A1 * | 12/2008 | Plank | B60H 1/00364 62/498 |
| 2010/0218529 A1 * | 9/2010 | Melbostad | B60H 1/00371 62/244 |
| 2018/0328618 A1 | 11/2018 | Palmer | |

* cited by examiner

BAFFLE ASSEMBLY FOR VEHICULAR AIR CONDITIONER

FIELD OF THE INVENTION

The present disclosure relates generally to an air conditioning or air distribution assembly for channeling air flow in a recreational vehicle.

BACKGROUND OF THE INVENTION

Recreational vehicles often come equipped with air conditioners or air conditioning units for maintaining a comfortable temperature within the passenger compartment. The air conditioning units are typically mounted outside the recreational vehicle, as exhaustion of heated air from the heat exchange process of the air conditioning unit is necessary. As a result, the conditioned air must pass through an opening in the recreational vehicle.

This process is complicated by the fact that air conditioners generally employ both a supply side air stream for cooling the passenger compartment and a return side air stream for recycling air from within the passenger compartment, which is typically at a cooler temperature than the ambient air around the air conditioning unit. By recycling this cooler air, the efficiency of the air conditioning unit is dramatically increased because the air conditioning unit needs to remove less heat from the cooler recycled air.

However, both the supply side air stream and the return side air stream must pass through the opening in the recreational vehicle in order to reach the air conditioning unit. Mixing of these two air streams would result in the air conditioning unit providing conditioned air at a temperature below that which is desired. This is due to the fact that the temperature of the return side air stream is likely to be higher than that of the supply side air stream and mixing of the two would elevate the temperature of conditioned air provided to the passenger compartment. Thus, the two air streams must be separated from one another to prevent this mixture.

This problem has typically been addressed via physical separation of the two air streams by dividing the opening in the recreational vehicle into two compartments with a baffle and using tape or adhesive foam in an effort to seal the gaps around the baffle. Other attempted solutions also employed a baffle, but sought to stabilize the baffle fastening the bottom of the baffle to a mounting bracket attached to a frame around the perimeter of the recreational vehicle opening. However, both of these solutions are ineffective over time because they do not maintain a seal around the baffle. This can be due to the fact that, for instance, when the recreational vehicle is operated, the opening in the recreational flexes, causing adhesives to peel away over time and for gaps to form around the sides of the baffle, permitting the return side air stream to mix with the supply side air stream and reduce the efficiency of the air conditioning unit.

Therefore, a baffle assembly with a mounting apparatus that rigidly fixes the baffle assembly in place or seals the supply side air stream from the return side air stream is desirable.

BRIEF DESCRIPTION OF THE INVENTION

Aspects and advantages of the invention will be set forth in part in the following description, or may be obvious from the description, or may be learned through practice of the invention.

In one aspect of the present disclosure, an air distribution assembly for a recreational vehicle is provided. The air distribution assembly may define an opening in the recreational vehicle and may further include a frame and a baffle. The frame may be mounted within the opening of the recreational vehicle and define an air handling chamber. The baffle may be positioned within the air handling chamber and sealingly divide the air handling chamber into an air supply side and an air return side. The baffle may further include a baffle body and a mounting flange. The mounting flange may extend from the baffle body and be rigidly connected to an inside surface of the frame.

In another aspect of the present disclosure, an air conditioning system for a recreational vehicle is provided. The air conditioning system may define an opening in the recreational vehicle and may further include an air conditioning unit and an air distribution assembly. The air conditioning unit may further include an evaporator, a compressor, a condenser, and an expansion device. The air distribution assembly may further include a frame and a baffle. The frame may be mounted within the opening of the recreational vehicle and may define an air handling chamber. The baffle may be positioned within the air handling chamber and sealingly divide the air handling chamber into an air supply side and an air return side. The baffle may further include a baffle body and a mounting flange. The mounting flange may extend from the baffle body and be rigidly connected to an inside surface of the frame.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
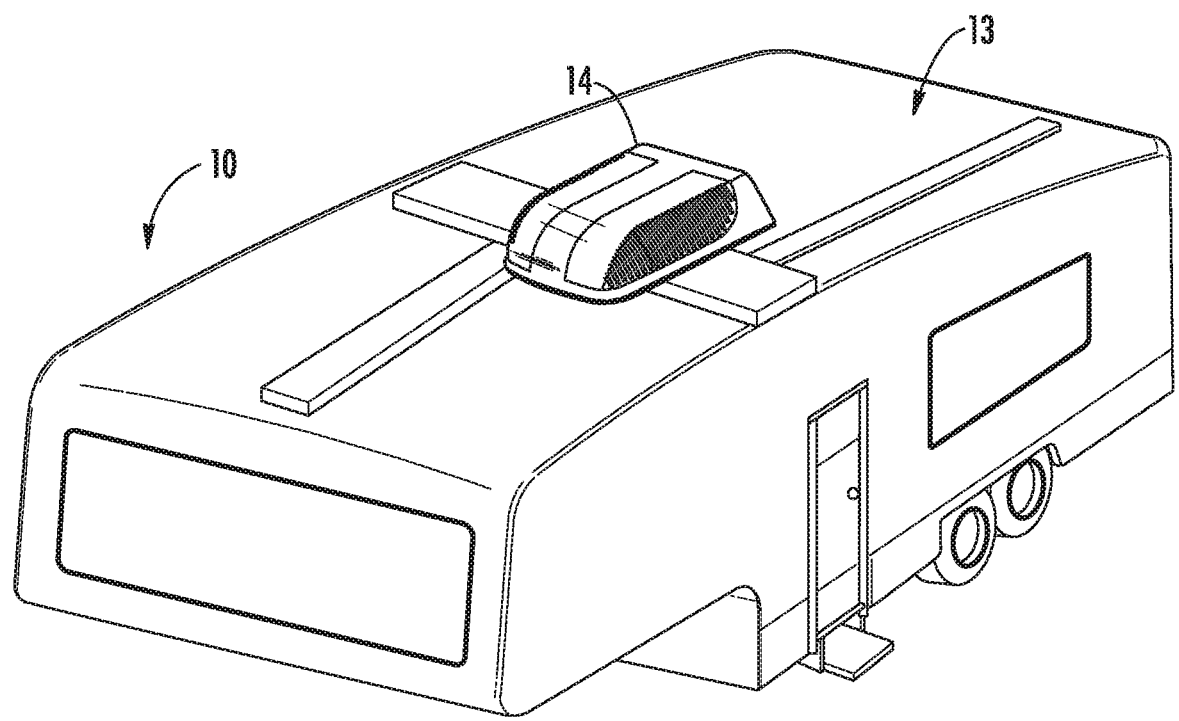
FIG. 1 provides a perspective view of a recreational vehicle according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

FIG. 1 provides a perspective view of an exemplary recreational vehicle 10 in accordance with the present disclosure. People may employ recreational vehicle 10 for a variety of purposes, including transportation, cooking, eating, sleeping, entertaining, and the like. As such, recreational vehicle 10 defines a passenger compartment, which may further include a bed, stove, table, restroom, or multiple compartments for storing items that passengers wish to take with them on their travels. Because people often spend significant time within the passenger compartment of recreational vehicle 10, climate control of the passenger compartment is desirable.

Accordingly, an air conditioning system 14 may be mounted on recreational vehicle 10 to provide cooled air to the passenger compartment. Air conditioning system 14 is typically mounted to an outside surface 13 of recreational vehicle 10. This arrangement is desirable because a byproduct of operation of air conditioning system 14 is heated air, which has been passed over a heat exchanger to remove heat from the air circulating within the passenger compartment. During certain operations, this heated air may be exhausted to the ambient air. As shown in the exemplary embodiment of FIG. 1, air conditioning system 14 may be mounted on an outer surface 13 on the top of recreational vehicle 13.

Figure 2:
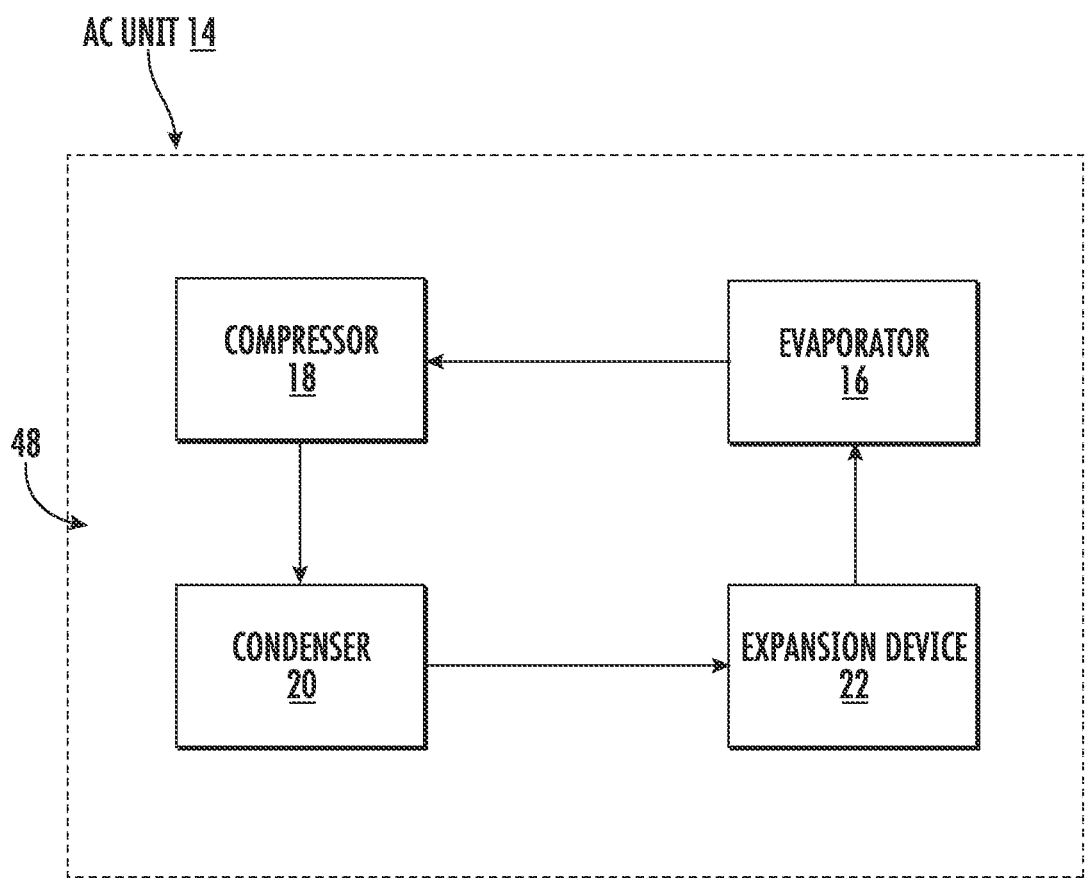
FIG. 2 provides a schematic view of an air conditioning system according to an exemplary embodiment of the present disclosure.

Air conditioning system 14 further includes refrigerant circulating between evaporator 16, compressor 18, condenser 20, and expansion device 22, as shown in the refrigeration loop 48 of air conditioning system 14 in FIG. 2. Refrigerant, also known as coolant, carries heat from the passenger compartment of recreational vehicle 10 to the outdoors (e.g., ambient area surrounding outer surface 13 or the passenger compartment). Refrigerant is useful because it changes states from a liquid to a vapor at convenient temperatures for a refrigeration cycle. One suitable refrigerant for use in refrigeration loop 48 is 1,1,1,2-Tetrafluoroethane, also known as R-134A, although it should be understood that the present disclosure is not limited to such example and that any suitable refrigerant may be utilized.

The refrigerant begins by passing through evaporator 16 in liquid form. Ambient air or air from the passenger compartment may pass over evaporator 16 (e.g., as motivated by an evaporator air handler—not pictured). Because the liquid refrigerant is cold in this low-pressure state, it absorbs heat from the air passing over it, cooling the air for delivery to the passenger compartment. As the liquid refrigerant absorbs heat, it evaporates into a vapor. From there, the gaseous refrigerant is delivered to compressor 18, which increases the pressure of the refrigerant, thus raising its temperature well-above the ambient temperature outside of recreational vehicle 10. From compressor 18, the heated refrigerant is delivered to condenser 20. Air may pass over condenser 20 (e.g., as motivated from a condenser air handler—not pictured), facilitating heat transfer from the heated refrigerant to the ambient air. In releasing this heat energy, the refrigerant condenses back into liquid form. Next, the refrigerant is delivered to expansion device 22, where the pressure of the refrigerant is reduced, thus decreasing its temperature. The cooled, liquid refrigerant is then delivered back to evaporator 16 to repeat the process.

Figure 3:
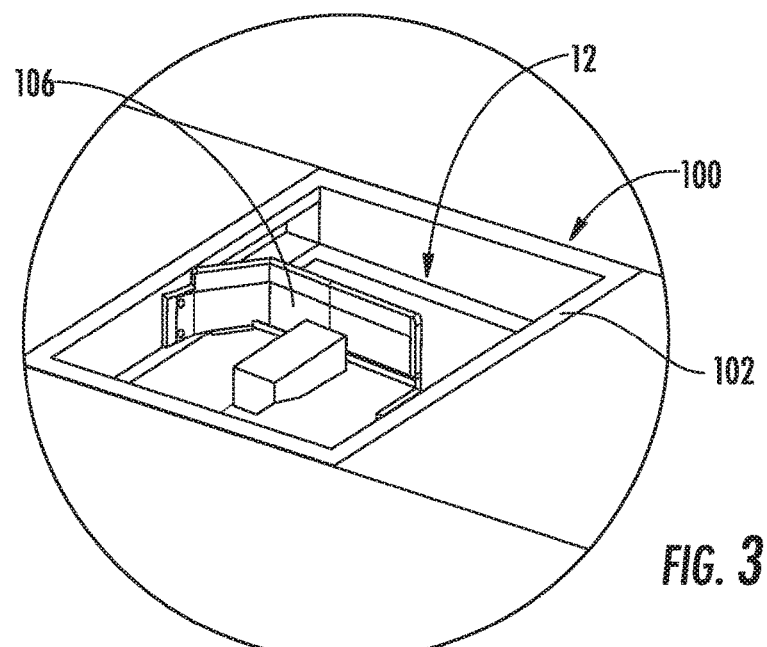
FIG. 3 provides a close-up perspective view of an air distribution assembly according to an exemplary embodiment of the present disclosure.
Figure 4:
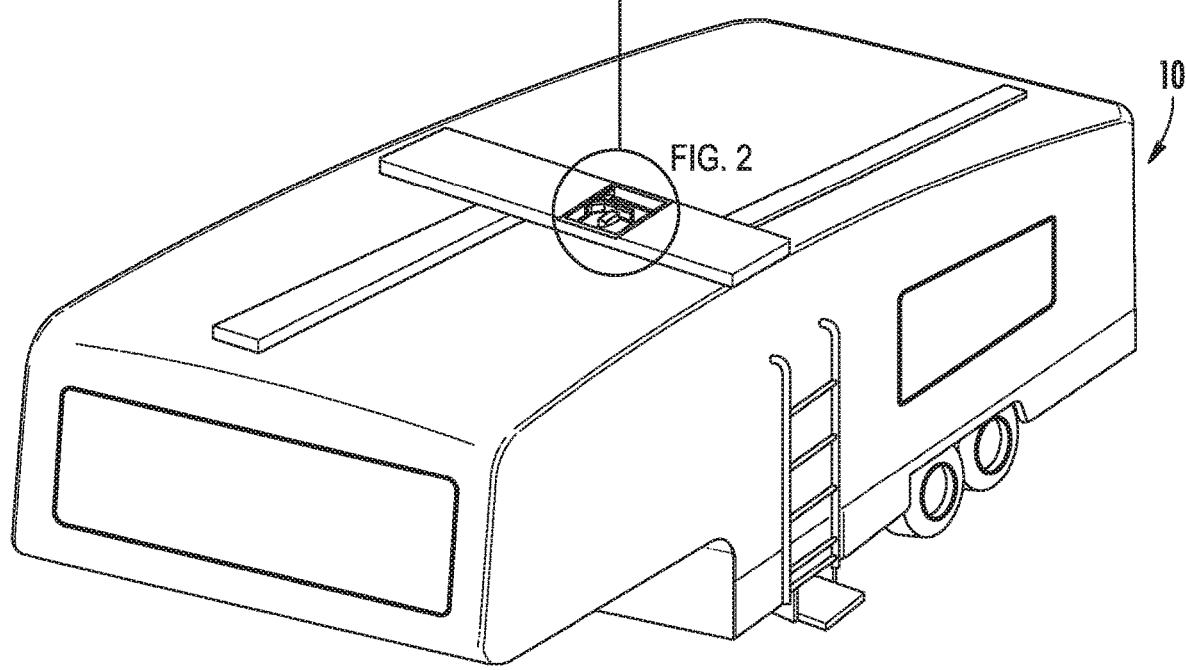
FIG. 4 provides a perspective view of an air distribution assembly in a recreational vehicle according to an exemplary embodiment of the present disclosure.

In order to transport cooled air for the air conditioning system 14 on an outside surface 13 of recreational vehicle 10 to the passenger compartment on the inside of recreational vehicle 10, an opening 12 must extend into recreational vehicle 10, an embodiment of which is shown in FIGS. 3 and 4. Opening 12 may be used to transport air from the passenger compartment to air conditioning system 14 to be recycled or recirculated between the passenger compartment and air conditioning system 14. Because the temperature of recycled air from the passenger compartment will typically be lower than that of the ambient air outside of recreational vehicle 10, this recycled air takes less energy for air conditioning system 14 to cool to the desired temperature, and thus increases the efficiency of air conditioning system 14.

Figure 5:
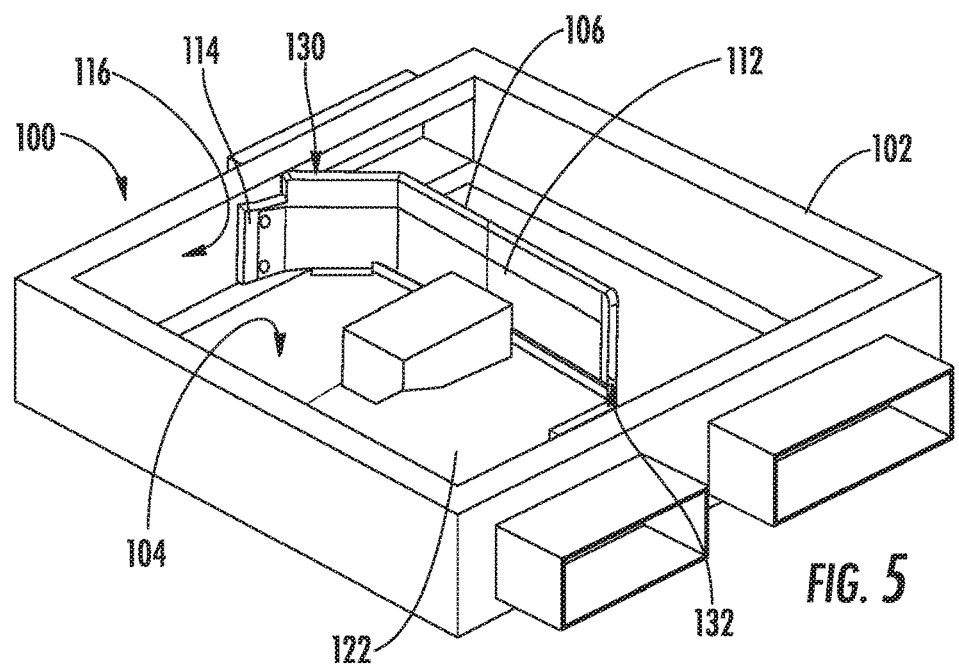
FIG. 5 provides a perspective view of an air distribution assembly according to an exemplary embodiment of the present disclosure.

As shown in the exemplary embodiments of FIGS. 3 and 5, air is delivered between air conditioning system 14 and the passenger compartment through air distribution assembly 100. Air distribution assembly 100 may include a frame 102 mounted within opening 12 of recreational vehicle 10. Frame 102 may define an air handling chamber 104 through which conditioned air may be delivered to the passenger compartment and through which air in the passenger compartment may be returned to air conditioning system 14.

Because there is only a single opening 12 in recreational vehicle 10 for the stream of conditioned air being supplied to the passenger compartment at a desired temperature and the stream of air being returned from the passenger compartment at an elevated temperature, the two air streams may be sealingly separated to prevent the conditioned air from being warmed by the return air. In some embodiments, such as those shown in FIGS. 5 and 6, a baffle 106 is positioned within air handling chamber 104 to sealingly divide air handling chamber 104 into an air supply side 108 and an air return side 110. Advantageously, baffle 206 may substantially eliminate the mixing of air on the air supply side 108 and the air return side 110. Additionally or alternatively, the desired air temperature of the supply air may be maintained.

To seal air supply side 108 from air return side 110, baffle 106 may be rigidly mounted to frame 102 so that the movement and flexing of components within air distribution assembly 100 during operation of recreational vehicle 10 does not permit gaps to form around baffle 106, which may otherwise permit mixing of air on air supply side 108 and air return side 110. Accordingly, baffle 106 may include a baffle body 112 and mounting flanges 114 extending from baffle body 112. As shown in FIG. 5, baffle body 112 has a first end 130 and a second end 132. Mounting flanges 114 may be present on both first end 130 and second end 132 of baffle body 112. In some such embodiments, mounting flanges 114 are rigidly connected to an inside surface 116 of frame 102 on both first end 130 and second end 132 (e.g., as shown in the embodiments of FIGS. 5 through 8). Advantageously, movement of frame 102 during operation of recreational vehicle 10 may result in corresponding movement of baffle 106. Mounting flanges 114 may be connected to frame 102 by bolts, screws, nails, staples, or any other suitable means of connection consistent with the disclosure herein.

Air distribution assembly 100 may include a floor 122 extending below baffle 106. As depicted in FIGS. 5 through 8, floor 122 may have an air supply opening 124 on air supply side 108 and an air return opening 126 on air return side 110 for communicating air to and from ducts arranged in a ducted system within recreational vehicle 10 (not pictured) for distribution and collection of conditioned air. In alternative embodiments, air supply opening 124 and air return opening 126 may communicate air to and from a central distribution point of a non-ducted system positioned within the passenger compartment of recreational vehicle 10.

Figure 7:
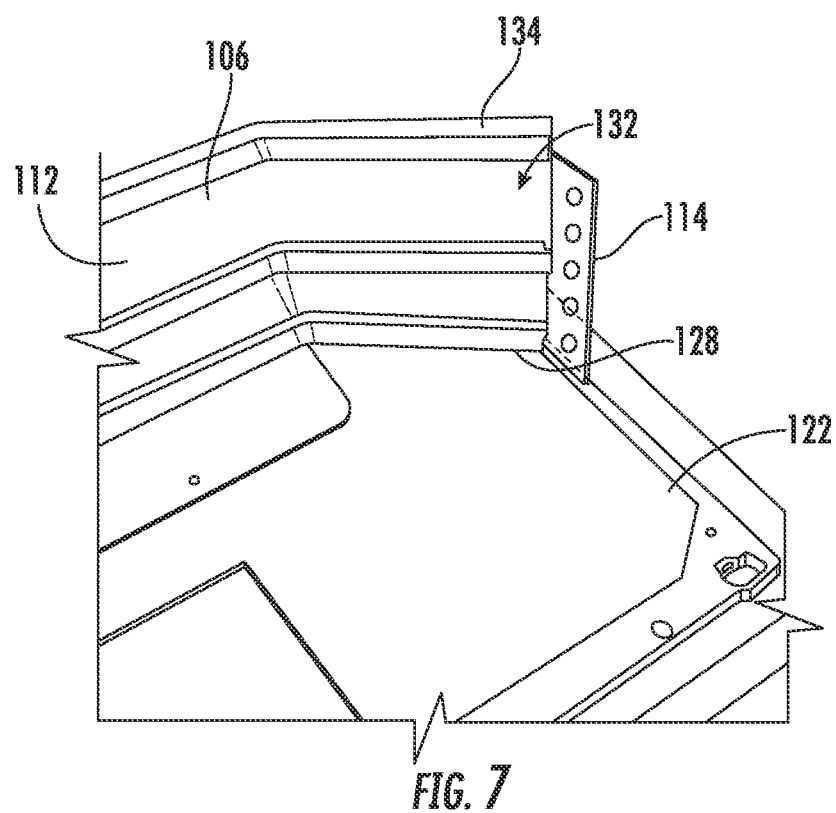
FIG. 7 provides a perspective view of mounting flanges for a baffle in a ducted air distribution system for a recreational vehicle according to an exemplary embodiment of the present disclosure.

While connecting mounting flanges 114 to inside surface 116 of frame 102 may form or provide a seal between air supply side 108 and air return side 110 on the sides of baffle 106, it may be advantageous to prevent air mixing between the two sides along the top or bottom of baffle 106. Accordingly, as shown in the embodiment of FIG. 7, a first sealing layer 128 connects baffle body 112 to floor 122 of air distribution assembly 100. Additionally or alternatively, a second sealing layer 134 connects baffle body 112 to a bottom side of air conditioning unit 14.

In the embodiment of FIG. 7, first sealing layer 128 and second sealing layer 134 are provided as (or include) adhesive foam attached to floor 122 and the bottom of air conditioning system 14 respectively. Compression of baffle body 112 against first sealing layer 128 and second sealing layer 134 is caused when air conditioning system 14 is mounted to outside surface 13 of recreational vehicle 10. This compression may cause baffle body 112 to penetrate the foam layer of first sealing layer 128 and second sealing layer 134, sealing the top and bottom of baffle 106. Even when frame 102 flexes during operation of recreational vehicle 10, baffle 106 merely slides along the foam layer of first sealing layer 128 and second sealing layer 134, maintaining its seal.

In alternative embodiments, first sealing layer 128 and second sealing layer 134 need not be adhesive foam, but rather may include any suitable sealant that maintains a seal in the face of movement of baffle 106.

Figure 6:
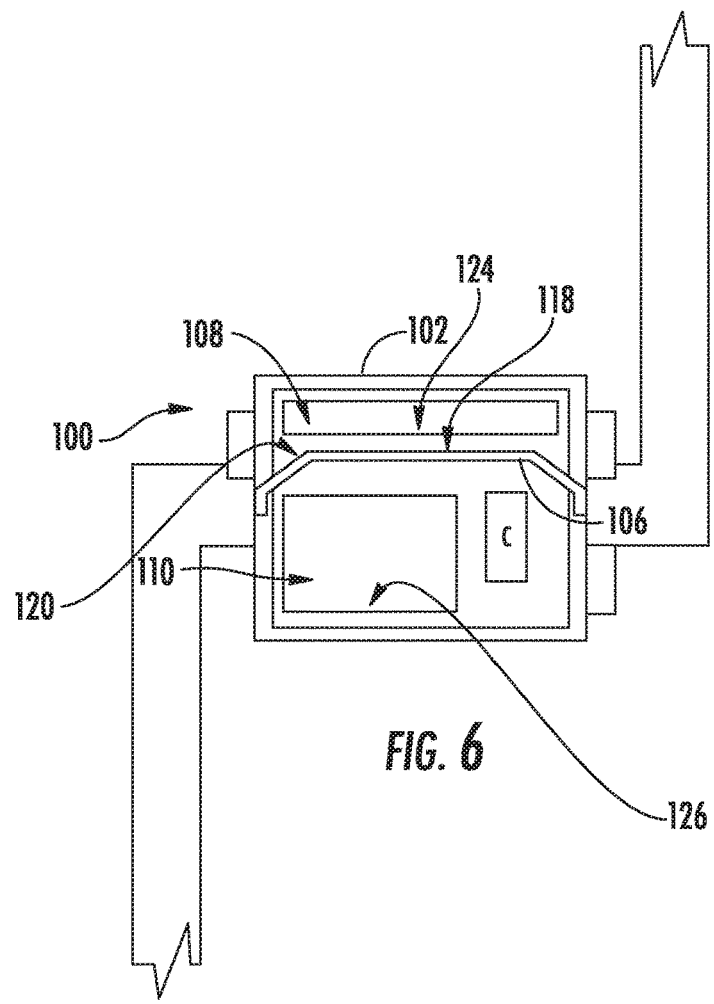
FIG. 6 provides a top view of an air distribution assembly according to an exemplary embodiment of the present disclosure.

Baffle 106 may take different forms depending on whether recreational vehicle 10 utilizes a ducted or non-ducted system. For example, FIGS. 5 through 7 depict a baffle that may be used in a ducted system. In some such embodiments, a controller for communicating between air conditioning system 14 and, for example, a thermostat may be mounted within air handling chamber 104 on air return side 110. In additional or alternative embodiments, baffle body 112 includes a center portion 118 and one or more outer portions 120. Outer portions 120 of baffle body 112 may be connected to center portion 118 of baffle body 112 at an obtuse angle relative to center portion 118 of baffle body 112. This angling of outer portions 120 may result in baffle 106 defining a larger air return side 110, thus providing sufficient space for the controller while enabling baffle body 112 to connect to an uninterrupted inside surface 116 of frame 102.

In certain embodiments, mounting flanges 114 are mounted to outer portions 120 of baffle body 112 and oriented perpendicular to center portion 118 of baffle body 112, thus maintaining a substantially perpendicular orientation between center portion 118 of baffle body 112 and inside surface 116 of frame 102 upon mounting of baffle 106.

Figure 8:
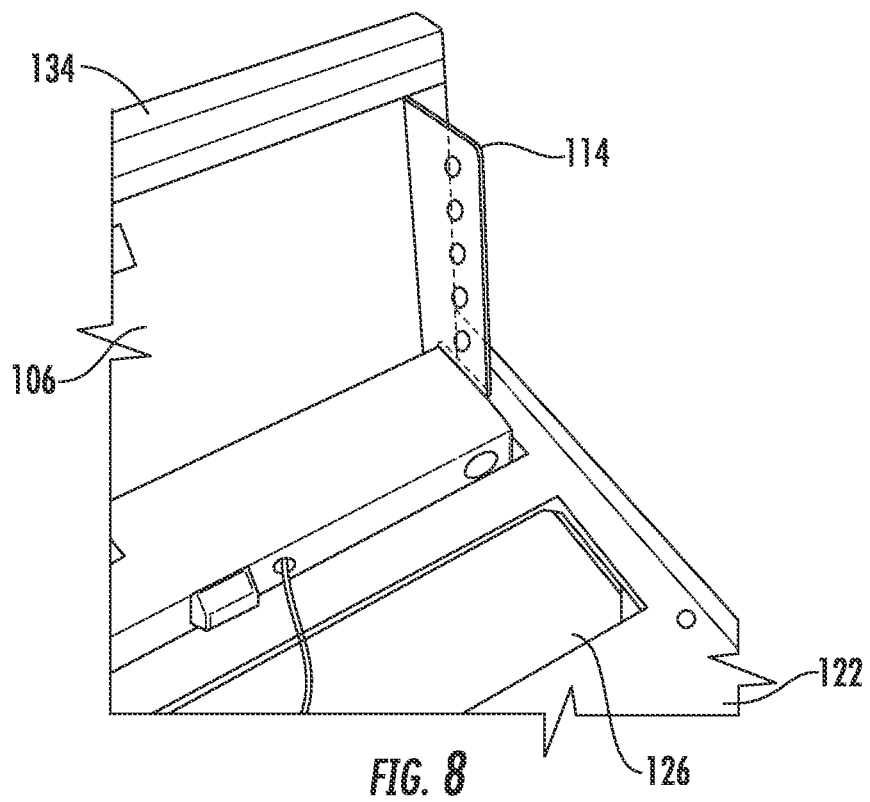
FIG. 8 provides a perspective view of mounting flanges for a baffle in a non-ducted air distribution system for a recreational vehicle according to an exemplary embodiment of the present disclosure.

Turning now especially to FIG. 8, in a non-ducted system, deflection of baffle body 112 may be unnecessary, as inside surface 116 of frame 102 has no interruptions and thus the location at which baffle body 112 is mounted to frame 102 is less restricted. In some such embodiments, baffle body 112 extends unbent along a single vertical plane from first end 130 to second end 132 of baffle body 112. As shown, such as in the embodiment of FIG. 8, mounting flanges 114 may be oriented perpendicular to baffle body 112 (e.g., to maintain a substantially perpendicular orientation between baffle body 112 and inside surface 116 of frame 102 upon mounting of baffle 106).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air distribution assembly for a recreational vehicle defining an opening, comprising
    a frame mounted within the opening of the recreational vehicle, the frame including a vertical inside surface extending through the opening, the vertical inside surface defining an air handling chamber;
    a baffle positioned within the air handling chamber, the baffle sealingly dividing the air handling chamber into an air supply side and an air return side, the baffle comprising
        a baffle body, and
        a mounting flange extending from the baffle body, the mounting flange being parallel to and rigidly connected to the vertical inside surface of the frame;
    a floor extending below the baffle, the floor having an air supply opening on the air supply side and an air return opening on the air return side;
    a first sealing layer interposed between the baffle and the floor, the first sealing layer connecting the baffle body to the floor; and
    a second sealing layer connecting the baffle body to a bottom side of the air conditioning unit, wherein the baffle body is in slideable contact with the first sealing layer and the second sealing layer such that the baffle body slides with respect to the first sealing layer and the second sealing layer in response to flexing of the frame.

2. The air distribution assembly of claim 1, wherein the baffle body further comprises a center portion and an outer portion, the outer portion of the baffle body being connected to the center portion of the baffle body at an obtuse angle relative to the center portion of the baffle body.

3. The air distribution assembly of claim 2, wherein the mounting flange is oriented perpendicular to the center portion of the baffle body.

4. The air distribution assembly of claim 1, wherein the baffle body extends unbent from a first end to a second end, thus occupying a single vertical plane.

5. The air distribution assembly of claim 4, wherein the mounting flange is oriented perpendicular to the baffle body.

6. The air distribution assembly of claim 1, wherein the first sealing layer is adhesive foam.

7. The air distribution assembly of claim 6, wherein the first sealing layer is compressed between the baffle body and the floor.

8. The air distribution assembly of claim 1, wherein the baffle body has a first end and a second end, the first end and the second end of the baffle body both being connected to the inside surface of the frame.

9. An air conditioning system for a recreational vehicle defining an opening, the air conditioning system comprising:
   an air conditioning unit, comprising
      an evaporator,
      a compressor,
      a condenser; and
      an expansion device;
   an air distribution assembly, comprising
      a frame mounted within the opening of the recreational vehicle, the frame including a vertical inside surface extending through the opening, the vertical inside surface defining an air handling chamber;
      a floor;
      a baffle positioned within the air handling chamber, the baffle sealingly dividing the air handling chamber into an air supply side and an air return side, the baffle comprising
         a baffle body;
         a mounting flange extending from the baffle body, the mounting flange being parallel to and rigidly connected to the vertical inside surface of the frame;
      wherein the air distribution system further comprises a first sealing layer connecting the baffle body to the floor and a second sealing layer connecting the baffle body to a bottom side of the air conditioning unit, the baffle body being in slideable contact with the first sealing layer and the second sealing layer such that the baffle body slides with respect to the first sealing layer and the second sealing layer in response to flexing of the frame.

10. The air conditioning system of claim 9, wherein the baffle body further comprises a center portion and an outer portion, the outer portion of the baffle body connected to the center portion of the baffle body at an obtuse angle.

11. The air conditioning system of claim 10, wherein the mounting flange is oriented perpendicular to the center portion of the baffle body.

12. The air conditioning system of claim 9, wherein the baffle body extends unbent from a first end to a second end, thus occupying a single vertical plane.

13. The air conditioning system of claim 12, wherein the mounting flange is oriented perpendicular to the baffle body.

14. The air conditioning system of claim 9, wherein the baffle body has a first end and a second end, the first end and the second end of the baffle body both being connected to the inside surface of the frame.

15. The air conditioning system of claim 9, wherein the first sealing layer and the second sealing layer are adhesive foam.

16. The air conditioning system of claim 15, wherein connecting the baffle body to the floor further involves the baffle body compressing the adhesive foam of the first sealing layer.

17. The air conditioning system of claim 15, wherein connecting the baffle body to the bottom side of the air conditioning unit further involves the baffle body compressing the adhesive foam of the second sealing layer.

18. The air conditioning system of claim 9, wherein the baffle body extends between the air conditioning unit and the floor.

19. The air conditioning system of claim 18, wherein the baffle body is formed from a single, continuous material.

20. The air conditioning system of claim 9, wherein the floor further comprises an air supply opening on the air supply side and an air return opening on the air return side.

\* \* \* \* \*